7853X
N. Adams,
Pug Mill,
Patented Dec. 16, 1833.
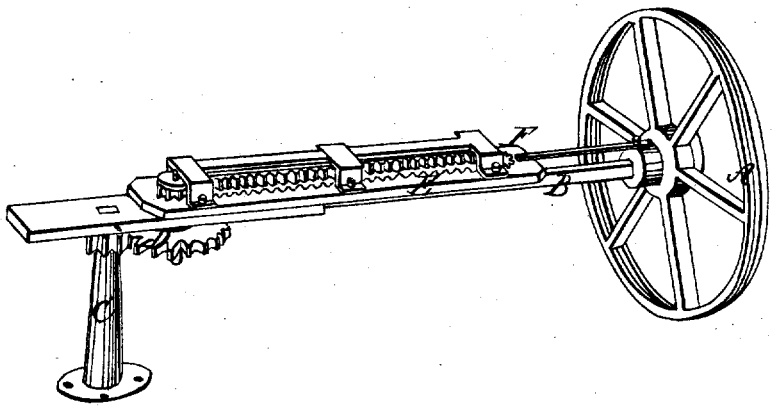
A.M. PHOTO-LITHO. CO. N.Y. (OSBORNE'S PROCESS)

Nathaniel Adams.

The schedule referred to in these Letters Patent, and making part of the same, containing a description in the words of the said Nathaniel Adams himself, of his improvement in the machine for Tempering Clay and preparing it for bricks &c.

This machine is intended to operate upon clay placed in a circular bed or pit, a wheel being made to revolve in this bed or pit, & by a shifting movement to pass in a spiral direction over the whole bed to within a convenient distance from the centre, while by its weight and form of its circumference it cuts up & mashes the clay into a homogeneous mass of the requisite toughness and temper. The advantages of which contrivance are the ease and facility of working the machine and tempering the clay.

The parts and proportions of this machine and the mode of its operation will be understood by reference to the annexed drawing. A. is a wheel of iron of about six feet in diameter, the circumference of which consists of one, two, or more rims or sections, separated from each other an inch or more as best suits the manufacturers purpose, so as to permit some of the clay to press through, and thereby more effectually to macerate and cut up the mass. The wheel turns on a bush through which one end of the shaft B, passes, the other end of the shaft is fastened upon a standard or post C. in the centre of the clay bed, in such manner as to turn upon it easily as the clay wheel revolves. The shaft is a square bar of iron or tough wood, the bush is fitted upon it so as to have no rotary motion, but to slide easily on the shaft.

The contrivance to produce the spiral track of the wheel in the clay bed is as follows, A Toothed wheel D, on the under side of the shaft, the axis of which passes through the shaft, is moved by teeth or cogs made in the standard or post before mentioned when the shaft is put in motion. Upon the axis of this wheel above the shaft, is a pinion which revolves with the axis & fits into the teeth of a double rack EE, which is fastened at one end to the bush, so that when the clay wheel is put in motion, the rack and with it the bush on wheel, are drawn from the outer end of the shaft until the pinion reaches the point of the rack D, which is of a circular form, & then continuing the same motion operates on the parallel row of teeth in the double rack, and restores the bush to its former place on the shaft, in the course of which operation the clay wheel will have passed from the outer to the inner edge of the bed, or, pit, and back.

This machine is superior to the pug wheel (heretofore commonly used) in facility of working and in tempering of the clay. And this applicant believes, that the contrivance in this specification described to produce a regular spiral motion of the wheel, without loss of power. or interruption of motion is altogether new. He therefore claims that contrivance in combination with the wheel above described as his invention.

Witnesses Nathaniel Adams.

W. P. Elliot

Exd. Wm. J. Steiger (Dr in portfolio) [585 words]